(12) United States Patent
Hsu et al.

(10) Patent No.: US 6,278,317 B1
(45) Date of Patent: Aug. 21, 2001

(54) CHARGE PUMP SYSTEM HAVING MULTIPLE CHARGING RATES AND CORRESPONDING METHOD

(75) Inventors: Louis L. C. Hsu, Fishkill; Oliver Weinfurtner, Wappingers Falls; Matthew R. Wordeman, Mahopac, all of NY (US)

(73) Assignees: International Business Machines Corporation, Armonk, NY (US); Infineon Technologies North America Corporation, San Jose, CA (US)

( * ) Notice: Subject to any disclaimer, the term of this patent is extended or adjusted under 35 U.S.C. 154(b) by 0 days.

(21) Appl. No.: 09/430,807

(22) Filed: Oct. 29, 1999

(51) Int. Cl.[7] ....................................................... G05F 1/10
(52) U.S. Cl. ............................................................ 327/536
(58) Field of Search .................................... 327/534, 535, 327/536

(56) References Cited

U.S. PATENT DOCUMENTS

| | | |
|---|---|---|
| Re. 35,141 | 1/1996 | Ozaki et al. . |
| 4,961,007 | 10/1990 | Kumanoya et al. . |
| 5,034,625 | 7/1991 | Min et al. . |
| 5,072,134 | 12/1991 | Min . |
| 5,410,510 | 4/1995 | Smith et al. ........................ 365/201 |
| 5,426,334 | 6/1995 | Skovmand . |
| 5,734,291 * | 3/1998 | Tasdighi et al. ..................... 327/537 |
| 5,818,766 * | 10/1998 | Song .............................. 365/189.11 |
| 5,982,222 * | 11/1999 | Kyung ................................ 327/536 |
| 6,020,781 * | 2/2000 | Fujioka .............................. 327/541 |
| 6,031,411 | 2/2000 | Tsay et al. . |
| 6,041,011 * | 3/2000 | Umezawa et al. .................. 365/226 |
| 6,052,022 * | 4/2000 | Lee ..................................... 327/589 |
| 6,107,862 * | 8/2000 | Mukainakano et al. ............. 327/536 |

* cited by examiner

*Primary Examiner*—Jeffrey Zweizig
(74) *Attorney, Agent, or Firm*—Daryl K. Neff; Todd M. C. Li

(57) ABSTRACT

A charge pump generator system and method is provided in which one or more charge pumps are operated at multiple charging rates depending upon the level reached by a voltage supply. The system includes a limiter which provides a control signal based upon the level of the voltage supply. The control signal selects the frequency of a multiple frequency oscillator coupled thereto. The selected frequency determines the charge transfer rate of a charge pump used to maintain the voltage supply.

14 Claims, 7 Drawing Sheets

CHARGE PUMP SYSTEM HAVING MULTIPLE CHARGING RATES AND CORRESPONDING METHOD

FIELD OF THE INVENTION

This invention relates to integrated circuits and more specifically to a circuit and method for maintaining a supply voltage generated internally within an integrated circuit.

BACKGROUND OF THE INVENTION

It is often necessary to generate a supply voltage internally within an integrated circuit. Memory circuits, for example, may require the internal generation of a specialized supply voltage as a boosted wordline supply voltage (for example at 3.3V) or as a negative wordline low supply (for example at −0.5V). A charge pump is a device readily incorporated onto an integrated circuit which can be used to generate and maintain an internal supply voltage from an external voltage supply.

By way of illustration only and not intended to limit the meaning of "charge pump" to that particularly shown, FIG. 11 shows a simple schematic for a charge pump 250 used to generate a supply voltage Vout from a first constant voltage input Vdd. The charge pump 250 receives a CLK input, which determines the charge transfer rate, and a control signal P1, which controls on-off switching of the charge pump. As will be understood, CLK controls the reference potential Vclk and its inverse /Vclk at which capacitors CP2 and CP1 are alternately held. During a first half cycle of CLK, Vclk is held high, /Vclk is held low and CP1 is charged from the voltage input Vdd such that the voltage on CP1 rises toward /Vclk+Vdd. During a second half cycle of CLK, Vclk falls low, while /Vclk is raised high. This causes the potential on CP1 to rise, while the potential on CP2 temporarily falls such that charge stored on CP1 is transferred to CP2. Finally, during a second full cycle of CLK, charge is transferred from CP2 onto the generated voltage supply output Vout.

Demand for current from a supply voltage varies depending on the operational state of the integrated circuit. For example, in many systems such as computers and printers, a memory chip is sometimes operated in an active mode in which relatively high current is required; for example, to access data on the chip, and at other times is operated in a standby mode or "sleep mode" in which relatively little current is required, such as is required to merely protect internal steady state voltage levels, e.g. Vbleq against leakage currents when no memory cells are accessed.

FIG. 12 shows an example of a prior art charge pump system having both active charge pumps 124 and a standby charge pump 126. The active pumps 124 are enabled by a "pump enable" signal P1, while the standby charge pump 126 remains continuously enabled to supply current to the chip, such as required for refresh-only operation. The active pumps 124 are designed to meet the large demands for current of active operation and therefore, have a higher pumping capacity, i.e. are faster than the standby charge pump 126. On the other hand, the standby charge pump 126 is designed to consume little power and to maintain the output voltage at a nearly constant level for long periods of time and thus is designed with a lower pumping capacity, i.e. is slower. The standby pump 126 is only needed to replenish the charge that leaks away during standby mode or sleep mode, when no wordlines are activated within the chip. At any time that a wordline is activated for access to a stored bit or for a refresh operation, the active pumps are switched on. The standby charge pump 126 operates continuously at a single and slower speed compared to the active pump; i.e., based on a CLK frequency that does not change. Heretofore, because the standby charge pump was continuously operated at lower output current than active charge pumps, the standby pump had to be designed as a separate unit dedicated to that function. However, although the standby charge pump 126 provides considerably less output current than an active charge pump 124, the chip area required to implement the standby charge pump 126 is comparable to that required to implement the active charge pump 124.

FIG. 13 is a timing diagram illustrating the operation of the prior art charge pump system shown in FIG. 12. Active charge pumps 124 are conventionally driven by a ring oscillator that has a fixed output frequency which functions as a CLK input in a similar manner to the charge pump described above with reference to FIG. 11. Consequently, in an "active interval" of operation, active charge pumps 124 cause the output voltage to rise and fall relatively quickly, because the active charge pumps 124 can only be activated or deactivated based on the output voltage Vout exceeding a single reference voltage Vref. The level of "ringing" depends on the limiter speed and the impedance of the wiring. A limiter with a slower feedback speed and high wiring resistance results in higher level of ringing. This is because when the limiter detects the output level below the target level, it will activate a control signal (not shown) to turn the pump on. First, it takes time to trigger the control signal, then it takes more time to communicate the control signal along the wiring back to the charge pump. During these times, the voltage level will continue to undershoot. Similarly, when the limiter detects the output level has reached the target level, it generates a control signal to shut off the charge pump. However, the delay in generating the control signal and communicating it back to the charge pump causes the voltage level to overshoot.

One way of reducing such ringing would be to utilize a high speed limiter. However, high speed limiters are generally considered unsuitable because of their high power consumption owing to the use of a resistive voltage divider and a differential amplifier which draw high DC current. Another possibility would be to decrease wiring impedance by using wider conductors. However, doing so would directly contribute to an increase in chip area. The relatively large "ringing" in the Vout voltage level introduces noise into the memory chip. The standby charge pump 126 also operates during the active interval, but its output current has little effect upon the rise and fall of Vout, its output current being much smaller than that of the active charge pumps 124.

In a standby interval of operation, the active pumps 124 are switched off by the pump enable signal P1 becoming disabled. However, the standby pump 126 continues to operate. Therefore, the output voltage Vout slowly settles at or near a predetermined voltage level.

It is an object of the present invention to provide a charge pump system in which the dedicated standby charge pump is eliminated.

It is another object of the invention to provide a charge pump system which operates at more than one speed during different predetermined periods so as to more precisely control the output voltage and therefore, to reduce the amount of ringing, and consequently, reduce noise coupled onto the output voltage supply line.

SUMMARY OF THE INVENTION

These and other objects of the invention are provided by the multiple charging rate charge pump system and method of the present invention.

The charge pump system operates such that when the voltage level is lower than a first predetermined level, one or more active charge pumps are operated at a faster rate to increase the voltage rapidly towards its target level. When the voltage exceeds a first predetermined level, the active charge pumps are operated at a slower rate such that the rate of increase in the voltage becomes slower. Finally, when the voltage exceeds a second predetermined level (generally corresponding to the target voltage level), the active charge pumps are turned off.

At that time, preferably one charge pump is left switched on as a standby charge pump operating at a slower speed to assist in maintaining the target voltage level. When the voltage drops again below the second predetermined level, the active charge pumps are turned on again at the slower speed to restore the voltage to that level. However, if the active charge pumps do not output sufficient power, the voltage will drop below the first predetermined voltage level. In such case, the active charge pumps will again be operated at the faster rate, thus ensuring that the voltage is restored again to its target level. Although the embodiments shown below only describe charge pump control with respect to the generated voltage reaching each of two predetermined levels, it will be understood by those skilled in the art how the principles and teachings of the invention are applied to a system in which control is effected with respect to more than two voltage levels. With the present invention, the output voltage level is maintained with much tighter control and without the aforementioned disadvantages of using a high speed limiter or wider wiring patterns.

According to a first aspect of the invention, a control circuit is provided for a charge pump generator used to maintain a voltage supply. The control circuit includes a limiter responsive to a voltage supply reaching a first predetermined voltage level to produce a first control signal, and an oscillator responsive to the first control signal to provide output at a selected one of at least two nonzero oscillating frequencies, wherein the selected frequency controls the rate at which a charge pump transfers charge to a generated supply voltage.

Preferably, the limiter is responsive to the voltage supply reaching a second predetermined voltage level for producing a second control signal, wherein the second control signal controls on-off switching of said oscillator. The limiter may include first and second limiting circuits, wherein the first limiting circuit produces the first and second control signals during an active interval, and the second limiting circuit produces a third control signal in response to the voltage supply reaching a third predetermined voltage level during a standby interval. The third control signal controls operation of the oscillator during the standby interval.

According to another aspect of the invention, a multiple rate charge pump generator system is provided for maintaining a voltage supply. The system includes a limiter responsive to the voltage supply reaching a first predetermined voltage level to produce a first control signal; an oscillator responsive to the first control signal to provide output at a selected one of two nonzero oscillating frequencies; and a charge pump coupled to receive the oscillator output, the charge pump transferring charge to the voltage supply at a rate determined by the selected oscillating frequency.

Preferably, the limiter of the charge pump generator system is further responsive to the voltage supply reaching a second predetermined voltage level for producing a second control signal, the second control signal controlling on-off switching of the oscillator.

Preferably, the charge pump is an active charge pump which operates only during an active interval and the generator system further includes a second charge pump coupled to the oscillator which operates during both the active interval and during a standby interval.

According to another aspect of the invention, a method is provided for maintaining a voltage supply generated internally within an integrated circuit. The method includes determining whether a voltage supply has exceeded a first predetermined voltage level; selecting one of a plurality of nonzero oscillating frequencies of an oscillator based on the determining; and applying the selected oscillating frequency to a charge pump, the oscillating frequency determining the rate of charge transfer from the charge pump to the voltage supply.

Preferably, the method includes discontinuing charge transfer from the charge pump to the voltage supply when the voltage supply has reached a second predetermined voltage level. Discontinuing charge transfer is preferably performed by disabling the oscillator.

Preferably, the selected oscillating frequency is applied to a plurality of active charge pumps and to at least one standby charge pump during an active interval, wherein each of the active charge pumps and the standby charge pump transfers charge to the voltage supply during the active interval. In such case, active charge pumps are disabled during a standby interval while leaving the standby charge pump enabled for operation.

DETAILED DESCRIPTION OF THE PREFERRED EMBODIMENTS

Figure 1:
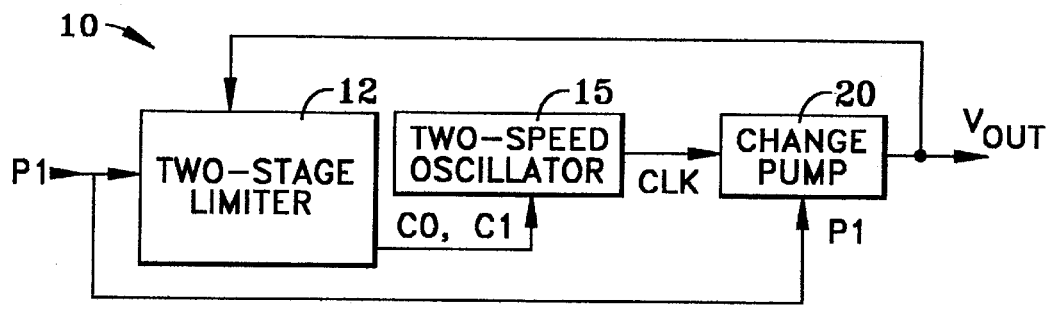
FIG. 1 is a block diagram showing a charge pump system constructed according to a first embodiment of the invention.

FIG. 1 is a block diagram showing a generator system 10 according to a first embodiment of the invention. In this embodiment, as in other embodiments described herein, the transfer of charge from a charge pump 20 to a generated voltage supply Vout is controlled in response to the voltage supply Vout reaching multiple predetermined voltage levels. The voltage supply level Vout is provided to a two-stage limiter 12 as a feedback input. When the voltage supply level is below a first predetermined voltage level V1, limiter 12 holds control signals C0 and C1 high to cause the CLK output of oscillator 15 to be high frequency. In response to the voltage supply reaching a first predetermined voltage level (V1), limiter 12, provides a control signal C0 which switches the frequency of the CLK output of two-speed oscillator 15 from a high frequency to a low frequency and thereby decreases the rate of charge transfer from the charge pump 20. Control signal C1 controls on-off switching of oscillator 15 and, indirectly, the on-of switching of the charge pump circuit 20 through the switching on or off of the CLK output of oscillator 15. Limiter 12 deactivates control signal C1 in response to the voltage supply reaching a second predetermined voltage level (V2).

Referring to FIG. 1 again, the frequency of oscillator output CLK determines the rate at which the charge pump 20 transfers charge to the voltage supply Vout. A "pump enable" input, labeled P1, is provided to limiter 12, and to the oscillator and the charge pump as well for on-off switching of the generator system, so that charge pump operation can be stopped when the chip is powered down or during sleep intervals in order to reduce power consumption.

Figure 2:
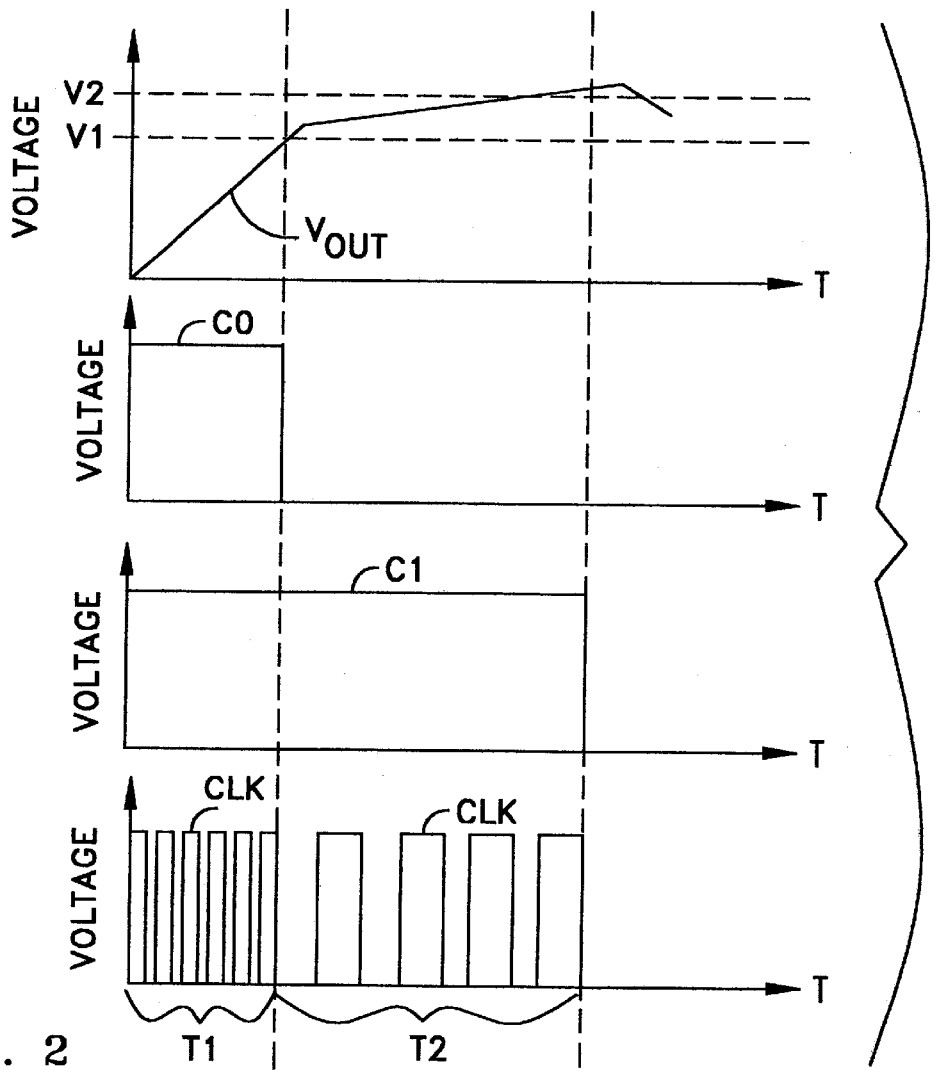
FIG. 2 is a timing diagram showing the activation of control signals C0 and C1 in relation to the voltage supply.

In operation, and as illustrated in FIG. 2, when charge pump system 10 is first turned on, control signals C0 and C1 are both activated (in high state), causing the output CLK of two-speed oscillator 15 to be high frequency, fh, as shown in interval T1. The high frequency CLK, in turn, causes charge pump 20 to provide a high charge transfer rate such that Vout rises rapidly. When Vout reaches a first predetermined voltage level V1, limiter 12 deactivates control signal C0, causing oscillator 15 to change CLK to a lower frequency fl, as shown in interval T2. The lower frequency CLK slows down the charge transfer rate of charge pump 20, such that the rate of increase in Vout slows. When Vout reaches a second predetermined voltage level V2, limiter 12 deactivates control signal C1 as well. This, in turn, turns off oscillator 15 and charge pump 20, thereby stopping the transfer of charge from charge pump 20 to the voltage supply Vout.

Figure 3:
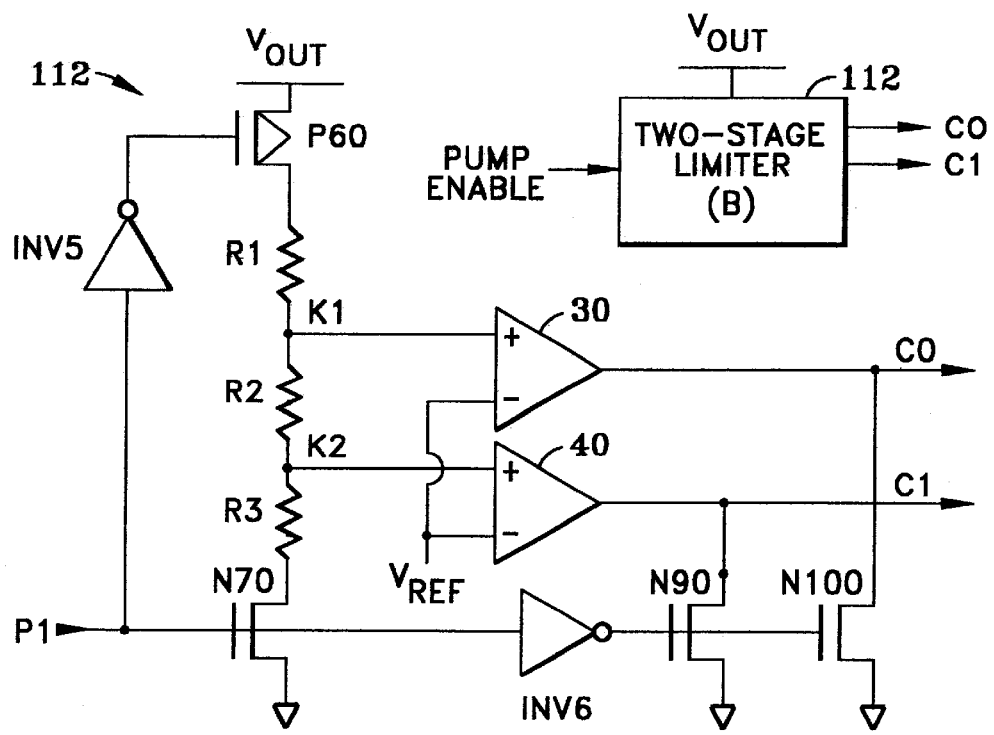
FIG. 3 is a schematic diagram of a two-stage limiter 112.

FIG. 3 shows a schematic drawing of a two-stage limiter 112 which can be used as limiter 12 in the embodiment described above with respect to FIG. 1. Limiter 112 includes a resistive divider formed by the series-connected resistors R1, R2 and R3 connected across Vout by transistor pair P60 and N70. The resistive divider provides output voltages K1 and K2 which lie in predetermined relation to Vout. Differential amplifier 30 deactivates a control signal C0 in response to the divided voltage K1 exceeding a fixed reference voltage Vref. Differential amplifier 40 operates in the same manner to deactivate a control signal C1, except that it operates in relation to the divided voltage K2. The two-stage limiter is switched on and off by a pump enable signal labeled P1 which enables and disables the generator system by controlling the transistor switches PMOS P60 and nMOS N70 together. Thus, while Vout is below a first voltage level V1, limiter 112 holds control signals C0 and C1 in a high state. Then, when Vout reaches the voltage V1, limiter 112 deactivates control signal C0. Finally, when Vout reaches the voltage V2, limiter 112 deactivates control signal C1.

Figure 4:
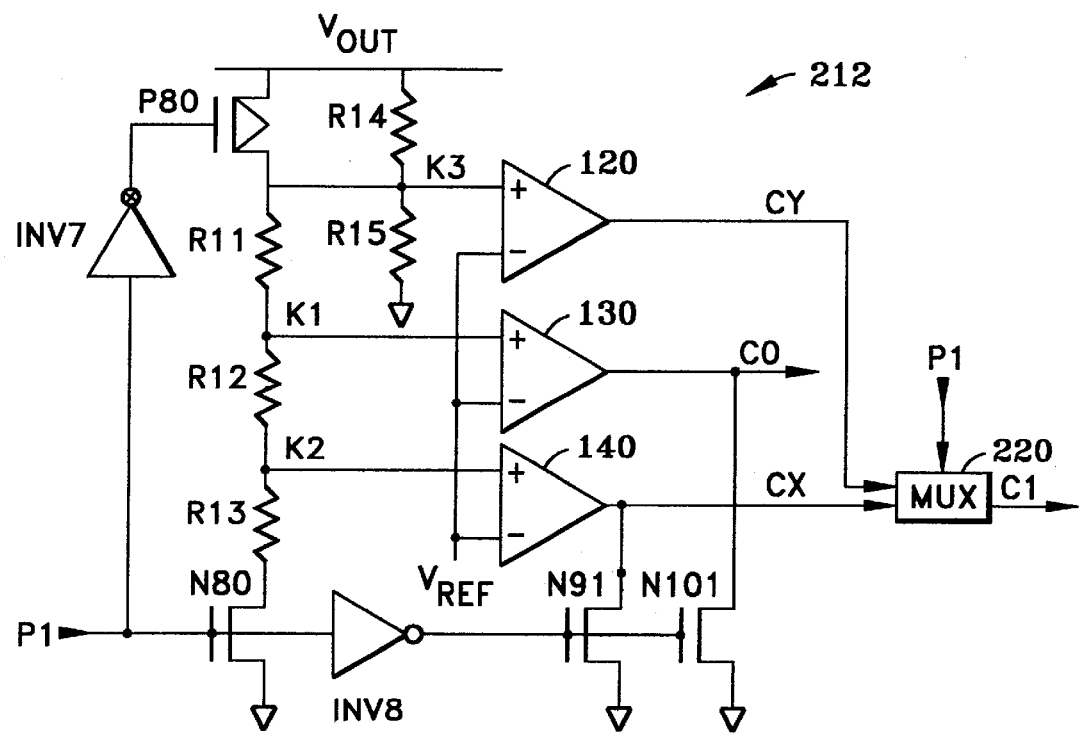
FIG. 4 is a schematic diagram of an alternative two-stage limiter 212.

FIG. 4 shows a schematic drawing of an alternative two-stage limiter 212 which operates in both active and standby operational modes. In addition to the circuitry of limiter 112, limiter 212 includes an additional resistive divider R14 and R15, a differential amplifier 120, and a multiplexer 220. Multiplexer 220 is responsive to the pump enable signal P1 being active during an active interval to select the intermediate control signal Cx for output as control signal C1. Control signal Cx is produced by circuitry like that of limiter 112 described above.

During a standby interval, when signal P1 is inactive, multiplexer 220 selects intermediate control signal Cy for output as control signal C1. Differential amplifier 120 activates a control signal Cy in response to Vout exceeding a voltage V3, which can be the same as either voltage level V1, or V2, or which may be a special voltage chosen for standby operation. Resistors R14 and R15 have preferably high resistance values so as to draw low DC current during standby operation.

Accordingly, during an active interval, when P1 is active, limiter 212 operates in like manner to limiter 112 to deactivate a control signal C0 when the voltage Vout falls exceeds a first predetermined voltage level V1, and to deactivate a second control signal C1 when the voltage Vout exceeds a second voltage level V2, as described above with reference to FIGS. 2–3.

During a standby interval, when the pump enable signal P1 is inactive (or low), multiplexer 220 selects Cy to output as control signal C1. Control signal Cy is activated when Vout exceeds a voltage level V3, which may be the same as either voltage V1 or V2, or which may be special voltage for standby operation.

Figure 5:
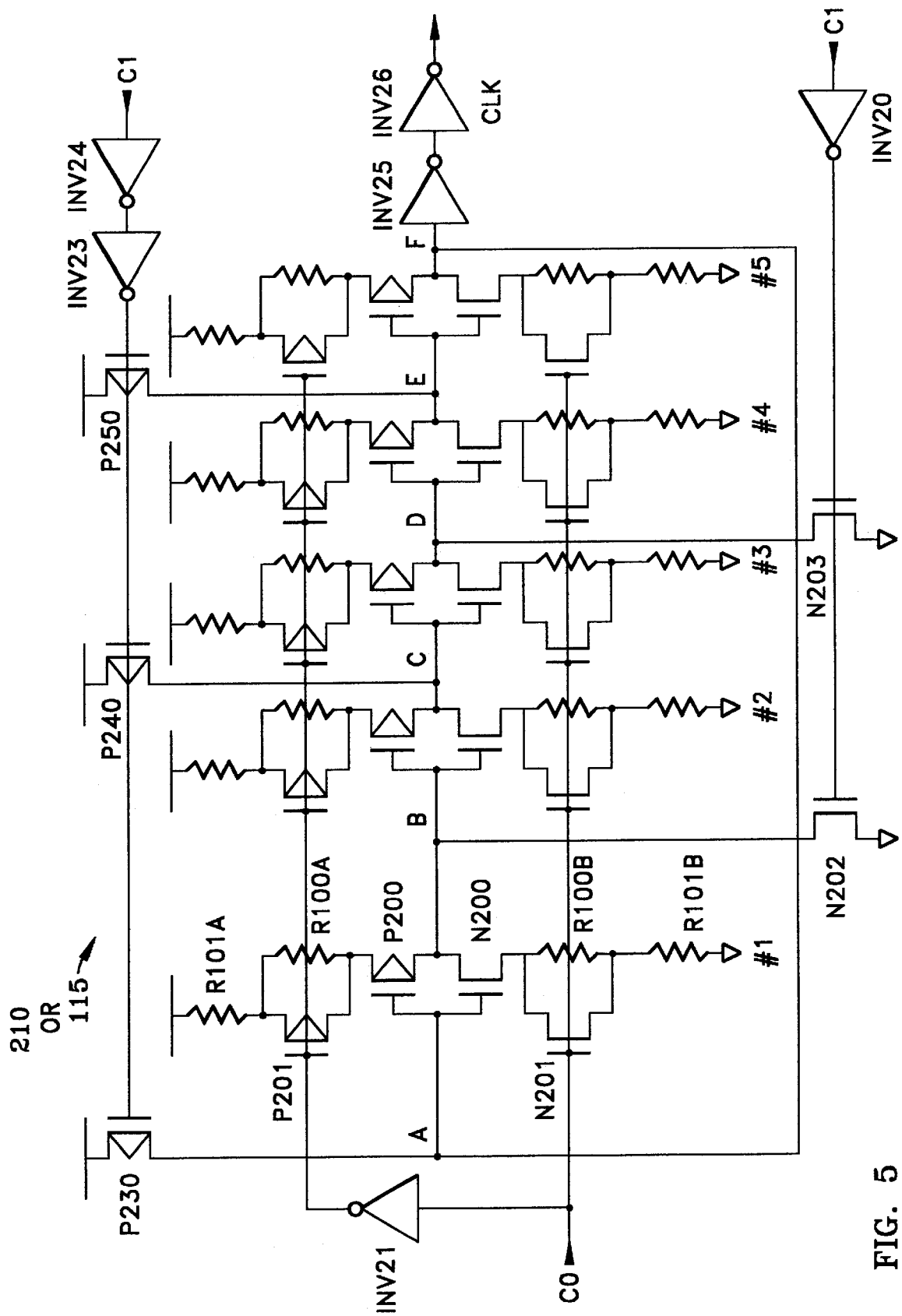
FIG. 5 is a schematic diagram of a two-speed oscillator 115.

FIG. 5 shows a schematic of an exemplary two-speed oscillator 115 which provides an oscillating CLK output at either one of two frequencies fh and fl. The exemplary oscillator 115 includes five stages which each provide a controllable delay which is reflected at the output node of each stage B, C, D, E and F. Each stage includes resistors R100A, R101A, R100B, and R101B, PMOS transistor switches P201, P200, and NMOS transistor switches N200 and N201. The resistors are arranged such that resistors R100A and R100B are bypassed when transistors P201 and N201 are turned on, when control signal C0 is in the high state. PMOS switches P230, P240 and P250 and nMOS switches N202 and N203 remain on so long as control signal C1 is high to cause oscillator 115 to operate.

Oscillator 115 operates as follows. When the pump is enabled and the output voltage Vout lies below a first voltage level V1, as shown in FIG. 2, both control signals C0 and C1 are in the high state. In this condition the oscillator 115 is turned on and provides the CLK output at a high frequency fh because transistors P201 and N201 are on, which causes resistors R100A and R100B of each stage to be bypassed. Thus, each stage of the oscillator has lighter loading and shorter delay. When control signal C0 is deactivated (falls low), transistors P201 and N201 are switched off, forcing current flow through resistors R100A and R100B, and thereby causing oscillator 115 to provide a CLK output at a lower frequency fl. Finally, when control signal C1 is deactivated, the oscillator 115 is switched off, thereby switching off the CLK output.

Figure 6:
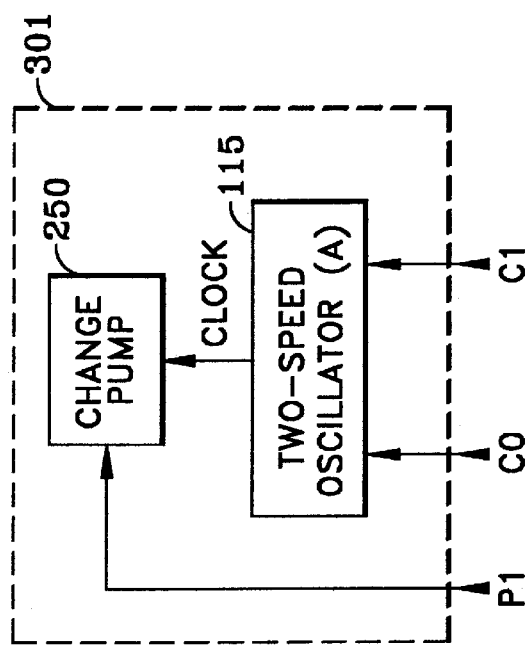
FIG. 6 is a block and schematic diagram of a Pump A unit.
Figure 11:
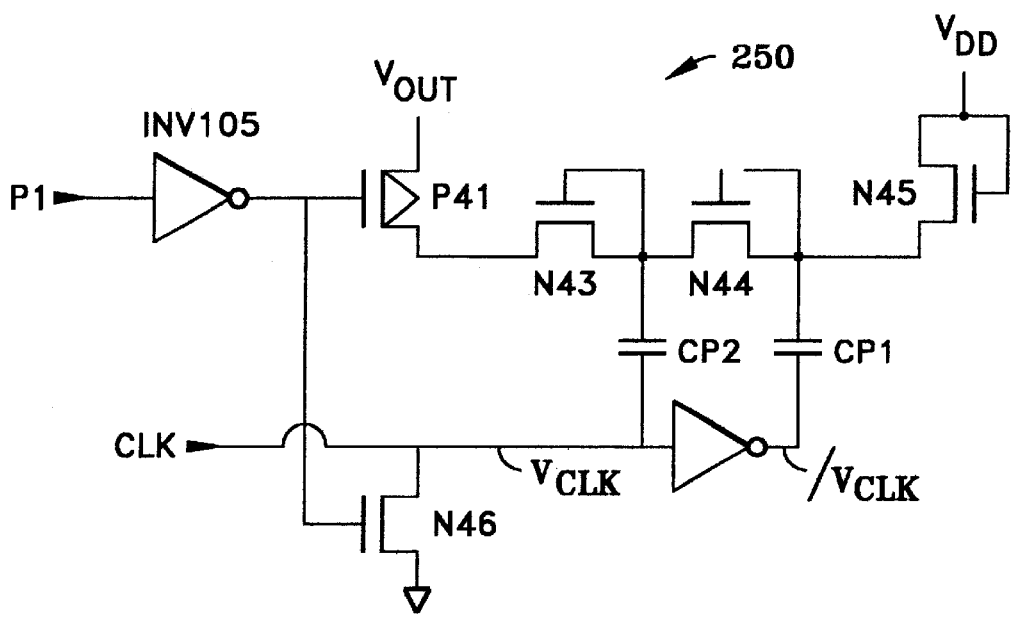
FIG. 11 is a schematic diagram illustrating an exemplary prior art charge pump.
Figure 12:
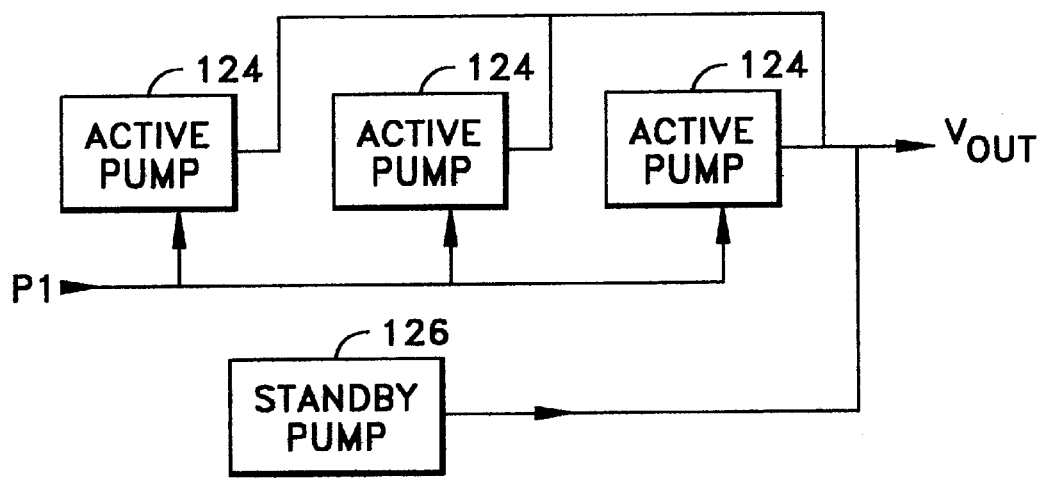
FIG. 12 is a block diagram illustrating a prior art charge pump system.
Figure 13:
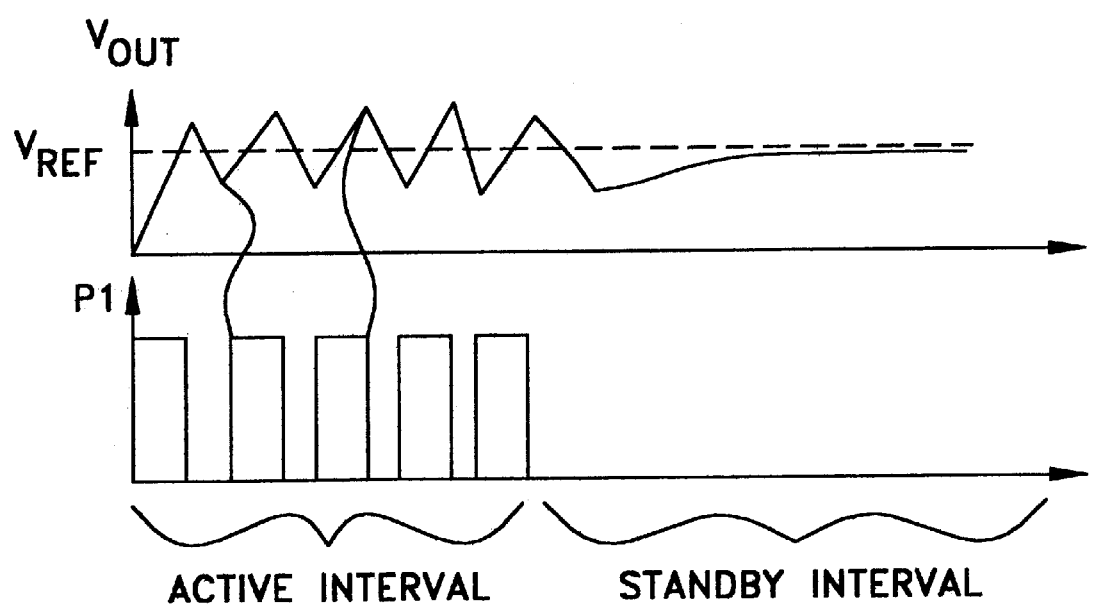
FIG. 13 is a timing diagram illustrating the operation of the prior art charge pump system shown in FIG. 12.

Pumps can be configured together in alternative ways so as to provide active and standby operation. FIG. 6 shows a block diagram of a charge pump configuration designated "Pump A" 301. Pump A includes a two-speed oscillator 115 and a charge pump 250, such as that shown and described above with reference to FIG. 11.

Figure 7:
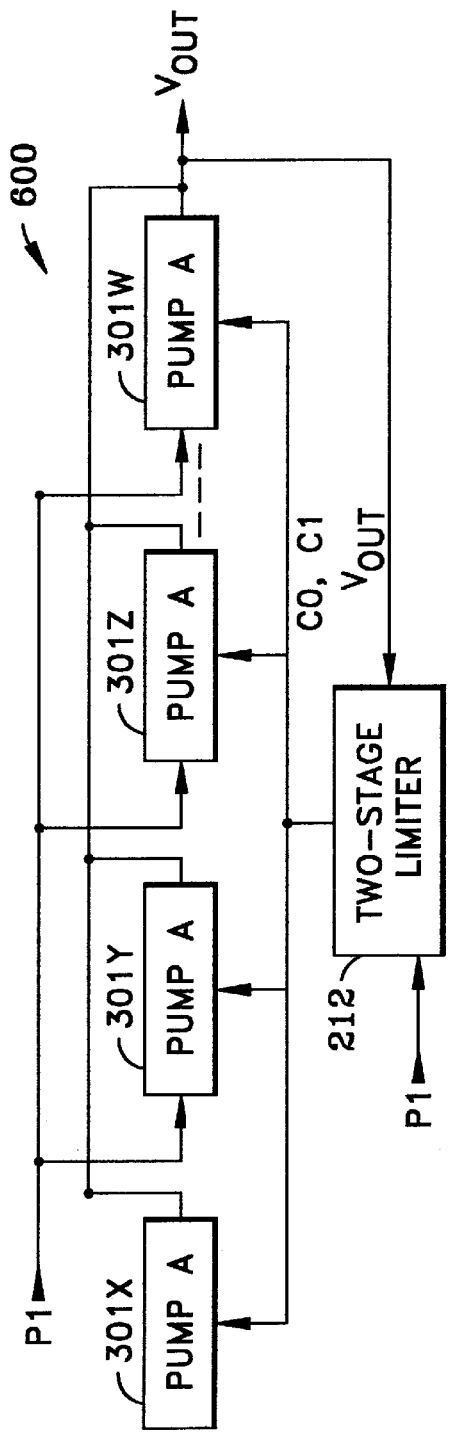
FIG. 7 is a block and schematic diagram of a multiple charge pump embodiment of the invention.

Therefore, in a first multi-pump embodiment 600 shown in FIG. 7, several "Pump A" oscillator/charge pump units 301y, 301z, 301w, etc. are wired to receive a pump enable (P1) signal and control inputs C0, C1 for both standby and active operation from the two-stage limiter 212 (FIG. 4). Another Pump A unit 301x is configured as an active/ standby unit which receives control inputs C0, C1 from two-stage limiter 212 but receives no pump enable (P1) input. Pump A 301x is continuously enabled, such that it operates in both active and standby modes. All Pump A units provide their output onto an output voltage Vout.

The multi-pump embodiment 600 operates in both active and standby modes. In active mode, the P1 signal is enabled, which, as shown in FIG. 4, causes two-stage limiter 212 to output control signals C0 and C1, which control the operation of each Pump A unit 301x, 301y, 301z, 301w, etc. in a manner such as that shown and described with respect to FIG. 2.

In standby mode, the pump enable (P1) signal is disabled, such that only Pump A 301x continues to operate, whereas Pump A units 301y, 301z, 301w are turned off. With reference to FIG. 4, when the pump enable (P1) signal is disabled, limiter 212 switches to standby operation, which disables output of the C0 control signal, and selects output of differential amplifier 120 (Cy) through multiplexer 220 as the C1 control signal. In such manner, only control signal C1 is outputted to Pump A 301x in standby mode, the control signal C1 being generated by an alternative, power-saving (lower current) path through resistors R14, R15 of limiter 212. Since control signal C0 is not output to Pump A 301x when P1 is disabled, Pump A 301x can be operated only at the slower speed during operation in standby mode.

An important feature of the invention is that Pump A 301x is configured to operate in both active and standby modes, thus eliminating the additional IC area that would be required for a standby charge pump that is activated only during standby operation.

Figure 8:
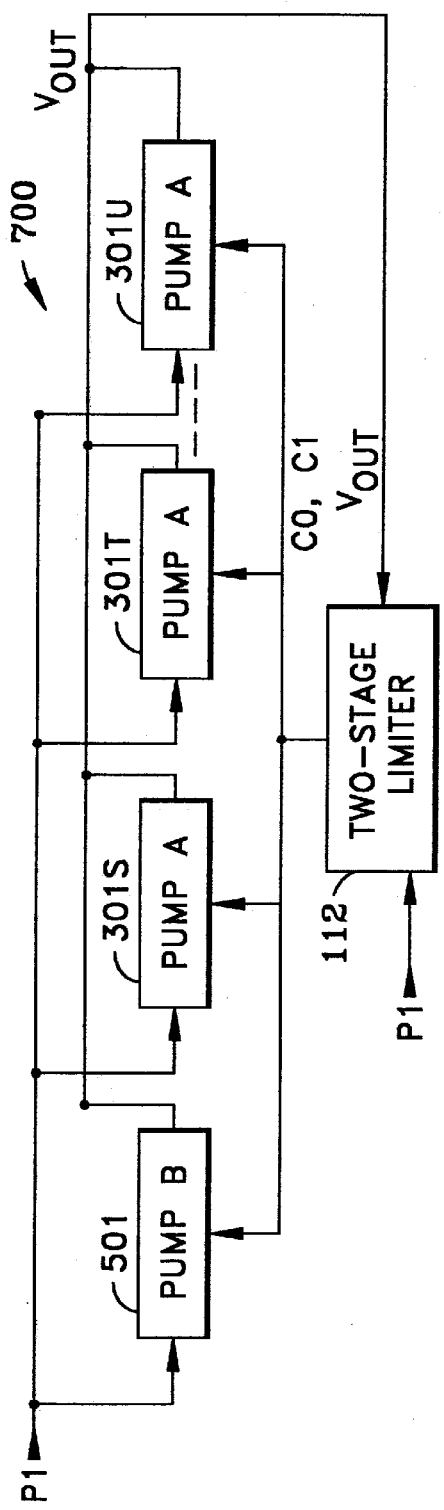
FIG. 8 is a block diagram of another multiple charge pump embodiment of the invention.

FIG. 8 shows a block diagram of a second multi-pump embodiment 700. This embodiment differs from embodiment 600 in that a "Pump B" unit 501 (FIG.9) is used instead of Pump A 301x (FIG. 7) as the active/standby unit and a less complex limiter 112 (FIG. 3) is wired to both the Pump B unit 501, and Pump A units 301s, 301t, 301u.

Figure 9:
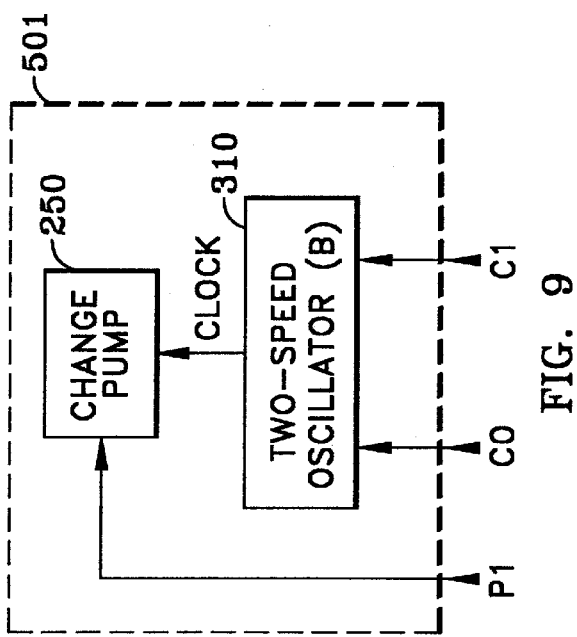
FIG. 9 is a block and schematic diagram of a Pump B unit shown in the embodiment illustrated in FIG. 8.
Figure 10:
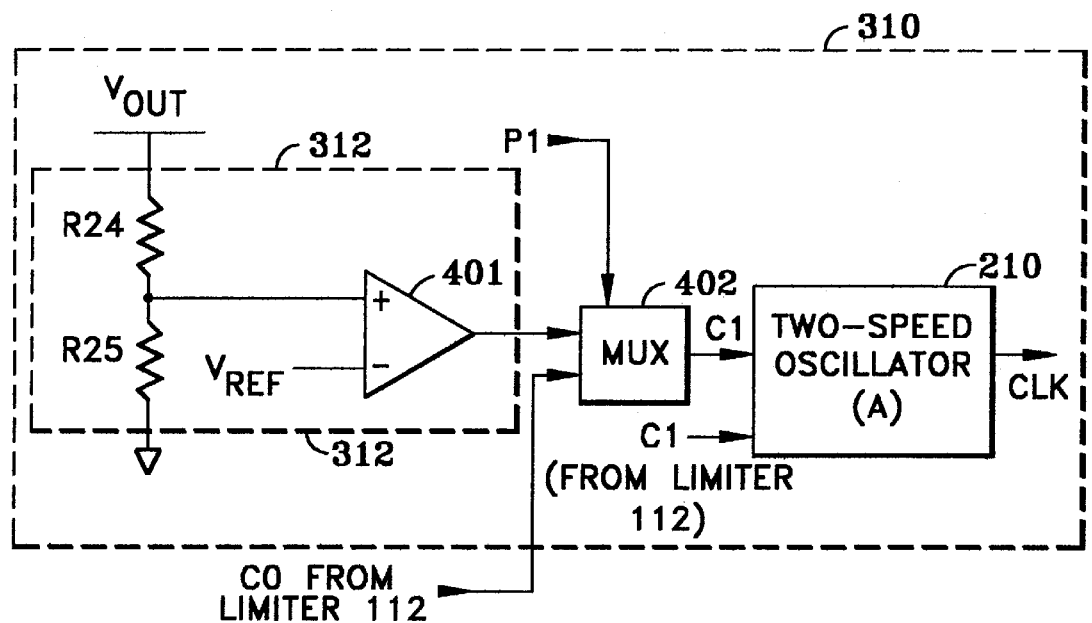
FIG. 10 is a block and schematic diagram of a two speed oscillator 310 used in the Pump B unit shown in FIG. 9.

FIG. 9 is a block diagram showing the construction of a pump B unit 501. Pump B unit 501 includes a charge pump 250 and a two-speed oscillator 310. FIG. 10 is a block diagram showing the construction of two-speed oscillator 310. Oscillator 310 includes an oscillator 210, which is the same as that shown and described above with reference to FIG. 5. Oscillator 310 also includes an internal limiter 312 formed by the combination of the voltage divider resistors R24, R25 and differential amplifier 401 coupled to receive the output of the voltage divider and a reference voltage Vref. The resistive divider formed by R24, and R25, and the differential amplifier 401 preferably have the same low current draw as the resistive divider formed by R14 and R15 and the differential amplifier 120 described above with reference to FIG. 4. Oscillator 310 also includes a multiplexer 402 which selects the C1 output of limiter 112 for transfer to the C1 input of oscillator 210 when the P1 signal is enabled during active mode operation, and selects the output of the internal limiter 312 for transfer to the C1 input of oscillator 210 when the P1 signal is disabled during standby mode operation.

Operation of this embodiment is described as follows. In active mode, when the pump enable (P1) signal is enabled, all Pump A and Pump B units 301s, 301t, 301u, 501 operate under control of signals C0 and C1 provided by two-stage limiter 112. Therefore, all Pump A and Pump B units operate as active pump units which supply charge onto the output voltage line Vout at charging rates which are determined by the voltage level that Vout has attained. As described above with reference to FIG. 2, when Vout is below a first predetermined voltage level V1, limiter 112 holds control signals C0 and C1 high, which operate two speed oscillator 310 at its higher frequency fh. When Vout rises above V1, control signal C0 transitions to a low level, which then causes oscillator 310 to operate at the lower frequency fl. When Vout rises above an even higher voltage level V2, control signal C1 transitions to a low level, which causes oscillator 310 to turn off.

In standby mode, when the pump enable (P1) signal is disabled, limiter 112 is disabled. Under such condition, Pumps A 301s, 301t and 301u are switched off by the disabled P1 signal. However, in standby mode, Pump B 501 operates under control of the internal limiter 312, whose output is selected by the disabled P1 signal provided to multiplexer 402 and passed to the C1 input of oscillator 210. In standby mode, control signal C0 from limiter 112 is inactive (low), such that oscillator 210 operates only at slow speed or is off.

During such standby mode, Pump B 501 holds control signal C1 high to operate two speed oscillator 210 whenever limiter 312 detects that Vout is less than Vref. Limiter 312 deactivates control signal C1 to turn off oscillator 210 when limiter 312 detects that Vout rises above Vref.

Those skilled in the art will understand that the principles of the invention apply with trivial modifications to the embodiments described herein to systems which more finely control an output voltage with a limiter having more than two stages and an oscillator having a corresponding number of output frequencies.

While the invention has been described in accordance with certain preferred embodiments thereof, those skilled in the art will recognize the modifications and enhancements which can be made without departing from the true scope and spirit of the present invention.

What is claimed is:

1. A control circuit for a charge pump generator used to maintain a voltage supply generated internally within an integrated circuit, comprising:

a limiter responsive to said voltage supply reaching a first predetermined voltage level to produce a first control signal; and an oscillator responsive to said first control signal to provide output at a selected one of at least two nonzero oscillating frequencies, said selected frequency controlling the charge transfer rate to a voltage supply of a charge pump coupled to said oscillator, wherein said limiter is further responsive to said voltage supply reaching a second predetermined voltage level for producing a second control signal, said second control signal controlling on-off switching of said oscillator.

2. The control circuit of claim 1 wherein said limiter includes first and second limiting circuits, said first limiting circuit producing said first and second control signals during an active interval, and said second limiting circuit producing a third control signal in response to said voltage supply reaching a third predetermined voltage level during a standby interval, said third control signal controlling operation of said oscillator during said standby interval.

3. The control circuit of claim 2 wherein said third control signal controls on-off switching of said oscillator during said standby interval.

4. The control circuit of claim 1 wherein said oscillator is of the ring oscillator type and includes one or more switching elements and one or more resistive elements, said one or more switching elements causing said one or more resistive elements to be bypassed in response to a change in said first control signal.

5. A multiple rate charge pump generator system for maintaining a voltage supply generated internally within an integrated circuit, comprising:

a limiter responsive to said voltage supply reaching a first predetermined voltage level to produce a first control signal, wherein said limiter is further responsive to said voltage supply reaching a second predetermined voltage level for producing a second control signal;

an oscillator responsive to said first control signal to provide output at a selected one of two nonzero oscillating frequencies, said second control signal controlling on-off switching of said oscillator;

a charge pump coupled to receive said oscillator output, said charge pump transferring charge to said voltage supply at a rate determined by said selected oscillating frequency.

6. The charge pump generator system of claim 5 wherein said limiter includes first and second limiting circuits, said first limiting circuit producing said first and second control signals during an active interval, and said second limiting circuit producing a third control signal in response to said voltage supply reaching a third predetermined voltage level during a standby interval, said third control signal controlling operation of said oscillator during said standby interval.

7. The charge pump generator system of claim 6 wherein said third control signal controls on-off switching of said oscillator during said standby interval.

8. The charge pump generator system of claim 7 wherein said charge pump is an active charge pump which operates only during said active interval and said generator system further includes a second charge pump coupled to said oscillator which operates during both said active interval and during a standby interval.

9. A multiple rate charge pump generator system for a voltage supply comprising:

a limiter responsive to said voltage supply reaching a first predetermined voltage level to produce a first control signal;

an oscillator responsive to said first control signal to provide output at a selected one of two oscillating frequencies;

a plurality of charge pumps coupled to receive said output, said charge pumps transferring charge to said voltage supply at a rate determined by said selected oscillating frequency, wherein said plurality of charge pumps are active charge pumps which operate only during an active interval; and a standby charge pump which operates both during said active interval and during a standby interval, said limiter being further responsive to said voltage supply reaching a predetermined level to control on-off switching of said oscillator during said standby interval.

10. A multiple rate charge pump generator system for maintaining a voltage supply generated internally within an integrated circuit, comprising:

a limiter responsive to said voltage supply reaching each of a plurality of predetermined voltage levels to produce, in a plurality of output lines, corresponding control signals having discrete states;

an oscillator responsive to the states of said control signals to provide output at a selected one of a plurality of corresponding nonzero oscillating frequencies; and a charge pump coupled to receive said oscillator output, said charge pump transferring charge to said voltage supply at a rate determined by said selected oscillating frequency.

11. A method of maintaining a voltage supply generated internally within an integrated circuit, comprising:

determining whether a voltage supply has exceeded a first predetermined voltage level;

selecting one of a plurality of nonzero oscillating frequencies of an oscillator based on said determining;

applying said selected oscillating frequency to a charge pump, said oscillating frequency determining the rate of charge transfer from said charge pump to said voltage supply; and discontinuing charge transfer from said charge pump to said voltage supply when said voltage supply has reached a second predetermined voltage level.

12. The method of claim 11 wherein said discontinuing is performed by disabling said oscillator.

13. The method of claim 11 wherein said selected oscillating frequency is applied to a plurality of active charge pumps including said charge pump and to at least one standby charge pump during an active interval, each of said active charge pumps and said standby charge pump transferring charge to said voltage supply during said active interval, said method further comprising disabling said active charge pumps during a standby interval while leaving said standby charge pump enabled for operation.

14. The method of claim 13 further comprising determining, during said standby interval, whether said voltage supply has reached a predetermined voltage level, and if so, discontinuing charge transfer from said standby charge pump.

* * * * *